(No Model.)

J. M. CHADWICK.
PERCOLATOR FOR COFFEE POTS.

No. 408,081. Patented July 30, 1889.

Witnesses
M. B. Harris
W. T. Pruchard

Inventor
James M. Chadwick
By his Attorneys
Edson Bros.

UNITED STATES PATENT OFFICE.

JAMES M. CHADWICK, OF GADSDEN, ALABAMA, ASSIGNOR OF ONE-HALF TO AZARIAH T. FULLER, OF SAME PLACE.

PERCOLATOR FOR COFFEE-POTS.

SPECIFICATION forming part of Letters Patent No. 408,081, dated July 30, 1889.

Application filed September 17, 1888. Serial No. 285,635. (No model.)

*To all whom it may concern:*

Be it known that I, JAMES M. CHADWICK, a citizen of the United States, residing at Gadsden, in the county of Etowah and State of Alabama, have invented certain new and useful Improvements in Percolators for Coffee-Pots; and I do hereby declare the following to be a full, clear, and exact description of the invention, such as will enable others skilled in the art to which it appertains to make and use the same.

My invention relates to improvements in coffee-pots; and it consists of the peculiar construction and arrangement of parts, as will be hereinafter fully described, and particularly pointed out in the claim.

My invention contemplates an improved coffee-pot having a cone-shaped receptacle detachably suspended within the pot by frictional contact therewith and so as to clamp between itself and the pot a fabric sheath or jacket, which prevents the coffee contained in the receptacle from escaping therefrom into the liquid in the pot, and also permits the steam to circulate freely through the receptacle and the contents thereof, as will be more fully hereinafter described.

Figure 1:
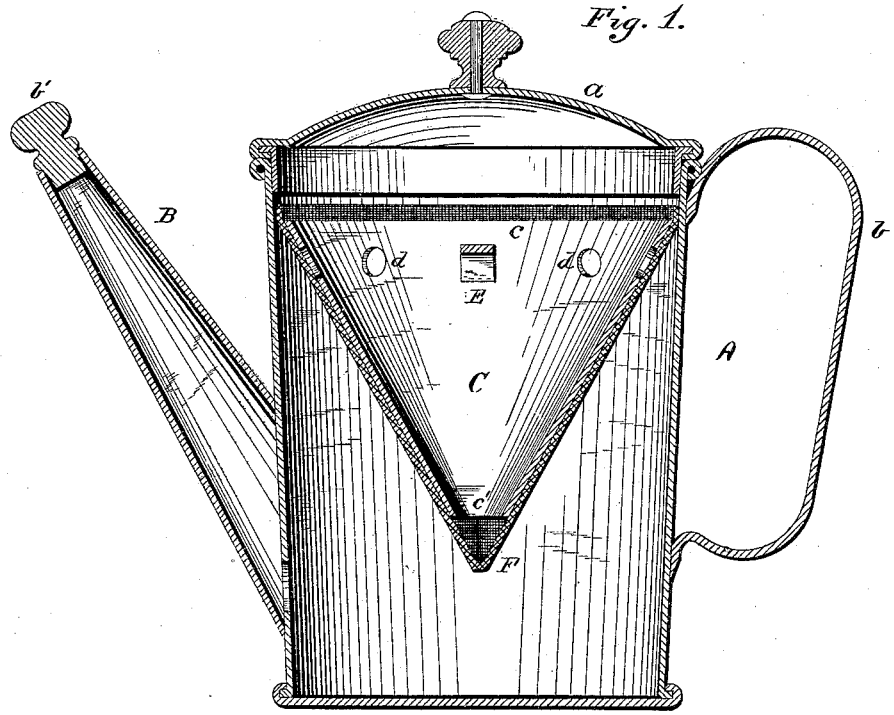
Figure 2:
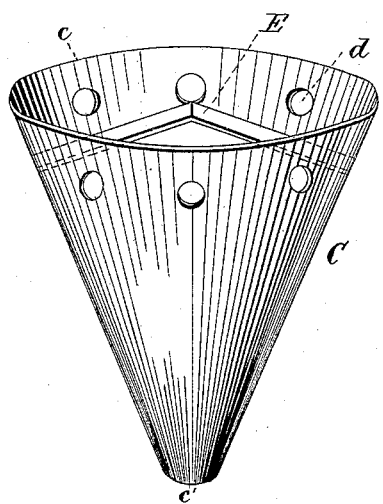

In the accompanying drawings, Figure 1 is a vertical central sectional view through a coffee-pot embodying my invention, and Fig. 2 is a detached detail view of the removable receptacle thereof.

Referring to the drawings, in which corresponding letters of reference denote like parts in both figures, A designates the coffee-pot proper, the body of which is tapered longitudinally from its upper open end toward the closed lower end thereof, and C is the interior receptacle for containing the coffee. The pot A is closed at its upper open end by a removable lid or cover $a$, and it is provided with the usual handle $b$ and a spout B, having a removable plug $b'$ fitted in its free open end.

The receptacle C is made in the form of an inverted cone, with the larger end thereof open, as at $c$, and in the apex or lower end of said cone-shaped receptacle is made an opening $c'$ for the escape of steam and moisture that may circulate or accumulate in the receptacle when the pot is used. Near the upper edge of the open end of the cone-shaped receptacle I provide a series of transverse apertures $d$, which extend entirely around the receptacle, and for conveniently removing the receptacle from and placing it in the pot A it is provided with a handle E, that extends transversely across the open end of the same and is fixed to the wall thereof below the apertures $d$.

The receptacle is covered by an exterior fabric sheath or jacket F, which is fitted or wrapped closely around the receptacle to follow the external contour thereof and close the opening $c'$ in the apex and the openings $d$ in the upper end of said receptacle, thus effectually confining the contents of the receptacle in the same, while at the same time the steam and moisture of the water in the pot can pass freely through the fabric sheath and apertures $c'$ $d$ in the receptacle to circulate through the latter and extract the strength of the coffee while it is confined therein.

The diameter of the upper open end of the receptacle corresponds nearly to the diameter of the upper open end of the pot A, and the upper edge of the fabric sheath or jacket is turned or lapped over the corresponding edge of the receptacle, so that when the latter is inserted in the pot the upper edge of the receptacle will bind against the wall of the pot near the upper end thereof, and the fabric sheath is clamped securely in place between the pot and the receptacle without the use of separate devices for confining the fabric sheath in place.

The receptacle is thus detachably suspended in proper position in the pot without the use of separate fastenings, and as the diameter of the tapered body of the pot decreases toward the base thereof it will be noted that the farther the receptacle is forced into the pot it will bind more tightly therein and the fabric sheath or jacket will be drawn more tightly around the receptacle, whereby said parts are tightly and securely held in position without the use of separate fastenings. The cone-shaped receptacle terminates a suitable distance above the bottom of the pot, and the edges of the fabric sheath or jacket can be united and then placed around the receptacle, or said edges can be left free and the sheath merely wrapped around the receptacle, because it will be held securely in place by being clamped between the pot and receptacle.

The receptacle and sheath can be easily and quickly placed in the pot for use, and likewise withdrawn to empty the contents of the receptacle. The fabric sheath can be easily separated or removed from the receptacle to cleanse the parts.

In order to prevent the escape of steam through the spout when there is a small quantity of liquid in the bottom of the pot, I have arranged the spout to enter the pot at or near the base of the coffee-pot. The liquid in the pot covers the outlet-opening leading to the spout, and thus prevents the escape of steam generated in the coffee-pot, the steam rising in the pot between the shell thereof and the receptacle C and entering the latter through the perforations $d$ in the upper end of the same. The steam and the moisture generated by condensation of the steam percolates through the coffee contained in the vessel C and escapes through the outlet-opening $c'$ at the apex of the vessel, thus thoroughly extracting the strength of the coffee.

The operation and advantages of my invention will be readily understood and appreciated from the foregoing description, taken in connection with the drawings.

Having thus fully described my invention, what I claim as new, and desire to secure by Letters Patent, is—

A coffee-pot consisting of a longitudinally-tapered body decreasing in diameter from its upper open end toward the base thereof and having a removable cover $a$, a cone-shaped receptacle C, detachably suspended in the body by the upper edge thereof binding against the wall or body of the pot a short distance below the upper end and cover of said pot, and having an opening $c'$ in its apex and a series of openings $d$ near the edge of its upper open end, and a fabric sheath or jacket fitted closely around said receptacle over the openings $c'$ $d$ therein and lapping the upper edge of the open end of the receptacle, whereby the fabric sheath and receptacle are suspended within the pot below the top thereof solely by frictional contact with the wall of the pot, and a space is provided between said wall and the receptacle to secure a free circulation through the openings $c'$ $d$, substantially as described.

In testimony whereof I affix my signature in presence of two witnesses.

JAMES M. CHADWICK.

Witnesses:
  R. A. D. DUNLAP,
  D. G. MCCAULEY.